United States Patent

[11] 3,562,537

[72] Inventor Walter E. Miller, Jr.
Huntsville, Ala.
[21] Appl. No. 854,845
[22] Filed Sept. 3, 1969
[45] Patented Feb. 9, 1971
[73] Assignee the United States of America as represented by the Secretary of the Army

[54] ELECTRO-OPTICAL DE-CORRELATION OF WAVEFRONT DISTORTION DUE TO ATMOSPHERIC SCINTILLATION
5 Claims, 4 Drawing Figs.
[52] U.S. Cl. ..................................................... 250/220, 250/209, 250/216
[51] Int. Cl. ..................................................... H01j 3/14, H01j 39/12
[50] Field of Search ........................................ 250/216, 220, 209, 203

[56] References Cited
UNITED STATES PATENTS
3,320,424  5/1967  Olson et al. ................... 250/203
3,432,671  3/1969  Edmonds ....................... 250/216X Primary Examiner—James W. Lawrence
Assistant Examiner—T. N. Grigsby
Attorneys—Harry M. Saragovitz, Edward J. Kelly, Berbert Berl and Aubrey J. Dunn ABSTRACT: A device for determining the angular position of a light source wherein light from the source is received by a lens, split into two paths, and detected by quadrant detectors placed before the focal point of the first path and after the focal point of the second path. The out-of-focus image (blur circle) received by one detector is inverted with respect to the image received by the other detector. The blur circles received by the detectors contain variations in intensity due to atmospheric scintillation. By comparing the light intensity received by the quadrants of each detector, the effects due to atmospheric scintillation are canceled, and the true angular position of the light source with respect to the axis of the detectors may be determined.

PATENTED FEB 9 1971 3,562,537

Walter E. Miller, Jr.
INVENTOR

Harry M. Saragovitz
Edward J. Kelly
Herbert Berl
Aubrey J. Dunn

BY

ELECTRO-OPTICAL DE-CORRELATION OF WAVEFRONT DISTORTION DUE TO ATMOSPHERIC SCINTILLATION

BACKGROUND OF THE INVENTION

This invention relates to electrooptical trackers which use a blur circle to determine the location of an object being tracked. A blur circle is the circular area of light which would be intercepted by a plane placed perpendicular to a path of light passing from a lens and at a point other than the focal point of the lens. Presently, light received from the object being tracked is focused at a focal point $f$ by a lens. A detector is placed either before or after the focal point and receives a blurred image. The amount of light received in the four quadrants of the detector determines if the object being tracked is directly in line with the center of the lens or to one side or the other. This is done by summing the light in each quadrant of the detector. For example, with a centered blur circle, the top quadrants and the bottom quadrants would have equal outputs as would the leftmost quadrants and the rightmost quadrants.

Prior art optical trackers do not compensate for atmospheric scintillation. Variations in the index of refraction of the transmitting atmosphere cause 3 distinct effects:

1. A "bending" of the source light beam. This causes the source to appear to be displaced from its true position by the amount the received light differs in direction from the true direction from the source, and is normally negligible.
2. An amplitude modulation of the received radiant power. This may cause electronic processing difficulties, but does not of itself constitute an angular error.
3. Wavefront distortion. This effect is the instantaneous variation of intensity across the receiver optics. The distance between two points in a beam where maximum probability of maximum intensity variation occurs is $\rho = \sqrt{\lambda D}$; where $\lambda$ is the wavelength of the light and $D$ is the source distance. If the receiver optics are of the same order of magnitude as $\rho$, a significant intensity gradient may exist across the receiver. This variation in intensity across the optics is reproduced in the blur circle previously referred to.

SUMMARY OF THE INVENTION

This invention provides a device that compensates for optical scintillation. Two light detectors are positioned to receive the light received from an object being tracked. The light is focused at focal point $f$. One detector is placed before $f$ and another detector is placed after $f$. The image before the focal point is inverted after passing through the focal point. Using this principle, each half of the blur circle received by the first detector is compared with the other half of the blur circle received by the second detector. The difference between the two is the true indication of the position of the object being tracked. Since the first detector is receiving the same image as the second detector, the effects of optical scintillation cancel out to give an indication of the true position of the tracked object.

DESCRIPTION OF THE PREFERRED EMBODIMENT

Figure 1:
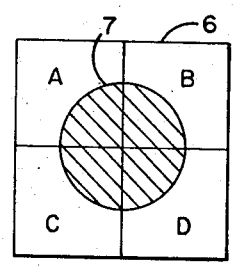
FIG. 1 is a plan view of a quadrant detector.

Referring to the drawing, FIG. 1 shows a state of the art photo sensitive quadrant detector having quadrants A, B, C, and D on which hatched blur circle 7 is displayed. A detector of this type is used at positions $b1$ and $b2$ in FIGS. 2, 3, and 4. Each quadrant has an electrical output indicative of the light incident thereon.

Figure 2:
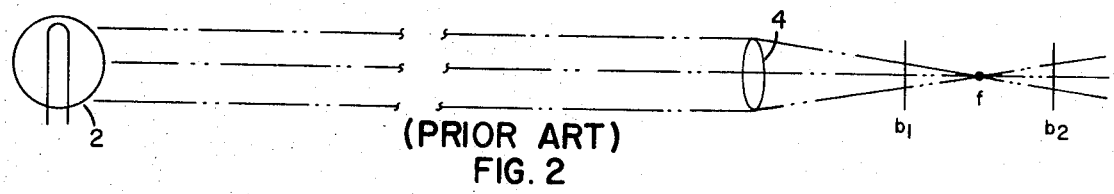
FIG. 2 is a schematic showing of a prior art device using a blur circle to determine the angular position of a light-emitting object.

FIG. 2 discloses a prior art device using blur circles to determine the angular position of a light emitting object. The light from object 2 is received by lens 4 and brought to focus at point $f$. The distance from the light-emitting object 2 to lens 4 is great compared to the focal length of lens 4. Quadrant detector 6 (FIG. 1) may be placed at either $b1$ or $b2$ so that the image (blur circle) received by the detector is blurred over a circular area large enough to cover a portion of all four quadrants of detector 6. The electrical output of the separate detector quadrants may be summed to yield blue circle position which is directly related to angular position of the source. For a centered blur circle 7, (see FIG. 1) $(A+B)-(C+D) = 0$ which means there is no vertical error. Similarly, $(A+C)-(B+D) = 0$ which would mean that there is no horizontal error. If the source is displaced from the optical axis, the angle of displacement may be measured by performing the above sums and differences and determining the proper system scale factor (degrees per volt, milliradian per microampere, etc.)

Figure 4:
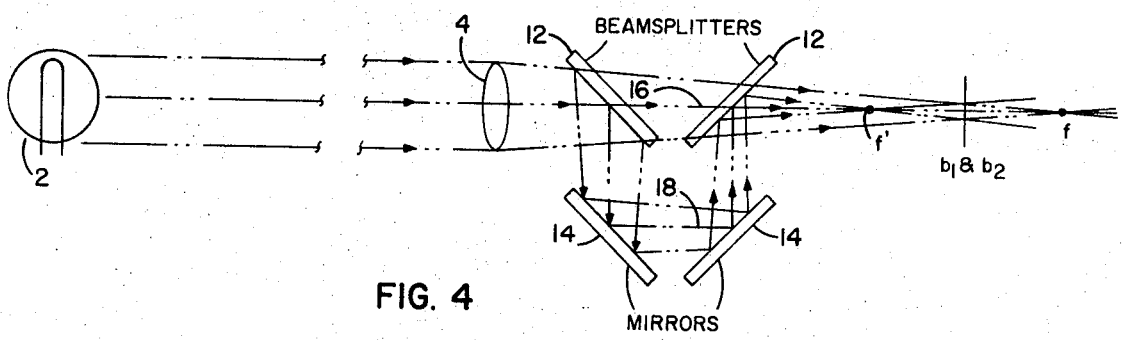
Figure 3:
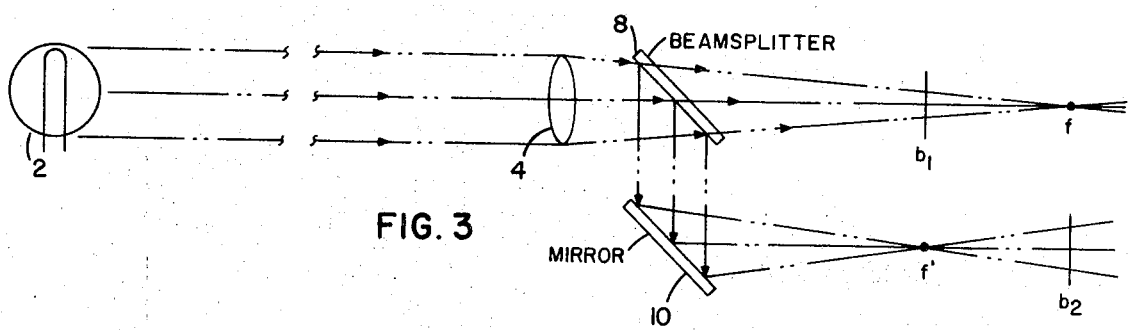
FIG. 3 is a schematic showing of the preferred embodiment of the present invention.

The present invention disclosed in FIGS. 3 and 4 is an improvement over the device set forth in FIG. 2 in that a beamsplitter is used to divide the light received by the lens into two paths of light. Detectors are used to detect the light intensity before the focal point in one path of light and after the focal point in the other path of light and cause the effects of atmospheric scintillation to cancel out. Since the purpose of the present invention is to measure angular source position in the presence of atmospheric scintillation, some means of separating the actual displacement of the blur circle from variations in intensity within it is required. This is accomplished by utilizing blur circles at both $b1$ and $b2$. Since the intensity distribution is inverted by the focal point, the sum of intensities at $b1$ and $b2$ (taken point by point within the "images") is symmetrical about the image center. Angular deviations of the source, however, produce displacements of the two blur circles in the same direction, so, the angular information may be separated from the intensity variations. Linear displacement at $b2$ is greater than at $b1$ for a given angular source position, which requires scaling of the detector at $b1$ and $b2$ or of their distances from the focal point, or perhaps both.

Referring to FIG. 3, two detectors may be used with beamsplitter 8 and mirror 10 to accomplish simultaneous detection at both $b1$ and $b2$. The outputs from the quadrants of the detectors placed at $b1$ and $b2$ may be summed to arrive at the true displacement of the blur circle since the effects of optical scintillation are canceled out. For example, the logic in the vertical channel would be $((A1 + A2) + (B1 + B2)) - ((C1 + C2) + (D1 + D2)) =$ angular source position.

A preferred embodiment of the invention is disclosed in FIG. 4. This arrangement permits the use of one detector placed at the point identified as $b1$ and $b2$. In this embodiment, beamsplitters 12 are used together with mirrors 14 to cause the blur circles which appear at $b1$ and $b2$ in FIG. 3 to appear at the same point, $b1$ and $b2$. In so doing, it is possible to use one detector to arrive at the angular source position. The focal point of beam 16 is at $f$. The focal point of beam 18 is at $f'$. Since a detector placed at $b1$ and $b2$ receives an erect image and an inverted image, the output of the detector is indicative of the angular position of the object being tracked. Beamsplitters 8 and 12 are special duty mirrors which both reflect and transmit received light as indicated in the FIGS. and are well known in the art.

The present invention has been described with particular reference to blur circle, quadrant detector, optical trackers. It could, however, be useful in any optical system which used blur circle position rather than image or focal point information, and which would be degraded by the variations in the intensity across the blur circle due to atmospheric scintillation. The present invention could also be useful in systems where astigmatism in the lens causes the blur circles to vary in uniformity. Use of applicant's invention would permit the use of lens of lower quality and, accordingly, lower cost.

I claim:

1. A device comprising a lens adapted to receive light; beamsplitting means adapted to receive light passed by said lens, said means providing a first path of light having a focal point $f$, and a second path of light having a focal point $f'$; means for detecting light intensity positioned in said first path of light before said first focal point $f$ and in said second path of light after said focal point $f'$.

2. A device as set forth in claim 1 wherein said beamsplitting means comprises a first beamsplitter, a second beamsplitter, and reflecting means; said first beamsplitter positioned to receive light passed by said lens to provide said first and second path of light; said second beamsplitter being positioned between said first beamsplitter and said focal point $f$; said reflecting means positioned adjacent said first beamsplitter whereby said second path of light is reflected onto said second beamsplitter; said second beamsplitter reflecting said second path of light whereby said first path of light and said second path of light are coincident at said focal point $f$ and said focal point $f'$.

3. A device as set forth in claim 1 wherein said means for detecting comprises a first quadrant detector and a second quadrant detector; said first quadrant detector being positioned between said beamsplitting means and said first focal point $f$; said second quadrant detector being positioned in said second path of light after said focal point $f'$.

4. A device as set forth in claim 2 wherein said means for detecting comprises a quadrant detector.

5. A device as set forth in claim 1 wherein said lens is a double convex lens.